(12) United States Patent
Magro

(10) Patent No.: US 6,918,016 B1
(45) Date of Patent: Jul. 12, 2005

(54) METHOD AND APPARATUS FOR PREVENTING DATA CORRUPTION DURING A MEMORY ACCESS COMMAND POSTAMBLE

(75) Inventor: James Magro, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 563 days.

(21) Appl. No.: 09/908,146

(22) Filed: Jul. 17, 2001

(51) Int. Cl.[7] .............................................. G06F 13/00
(52) U.S. Cl. ...................................... 711/154; 711/167
(58) Field of Search ................................ 711/154, 167

(56) References Cited

U.S. PATENT DOCUMENTS

| | | | | |
|---|---|---|---|---|
| 6,034,916 A | * | 3/2000 | Lee ............................ | 365/193 |
| 6,067,260 A | * | 5/2000 | Ooishi et al. ............... | 365/200 |
| 6,252,804 B1 | * | 6/2001 | Tomita ................... | 365/185.12 |
| 6,404,697 B1 | * | 6/2002 | Ryu et al. .............. | 365/230.04 |
| 6,424,590 B1 | * | 7/2002 | Taruishi et al. ........ | 365/230.03 |
| 2001/0007541 A1 | * | 7/2001 | Hirakawa .................... | 365/233 |

* cited by examiner

*Primary Examiner*—Reba I. Elmore
(74) *Attorney, Agent, or Firm*—Meyertons Hood Kivlin Kowert & Goetzel, P.C.; B. Noël Kivlin; Erik A. Heter

(57) ABSTRACT

An apparatus and method which block the strobing of a data FIFO array in a memory controller of a computer system after the data strobe has entered a fluctuating tristate phase, in particular in the setting of a system using double date rate (DDR) DRAM devices. Such a system generally includes DIMMs (dual in-line memory modules) driven by, and driving, data strobes over a bidirectional bus. Because of the use of a bus instead of point-to-point connections, the data strobes are allowed to fluctuate in a tristate phase, during which time false strobes could corrupt data in an input FIFO array coupled to a requesting device before capture of requested data. A circuit is presented which enables a masking circuit to allow passage of the strobe signals in response to a gate reset signal generated by the memory controller, but subsequently blocks the strobe signals before the strobe enters its tristate phase.

24 Claims, 8 Drawing Sheets

METHOD AND APPARATUS FOR PREVENTING DATA CORRUPTION DURING A MEMORY ACCESS COMMAND POSTAMBLE

BACKGROUND OF THE INVENTION

This invention relates to a new method and apparatus for use in a processor-based system, to prevent data corruption during the postamble phase of a memory access command. In particular, a system is described that prevents a tristate of a postamble of a command for access to a DDR (double data rate) DRAM device from corrupting data being read from or written to that device.

During a read access from a DDR DRAM device, read data is provided by the device (e.g. a DIMM, or dual in-line memory module) in response to a clock forwarded from the device. The read data is captured by the memory controller's storage elements with this forwarded clock.

In the JEDEC specification entitled "Double Data Rate (DDR) SDRAM Specification" (JESD79), incorporated herein by reference, the forwarded clock is referred to as the "DQS" signal, and the data provided by the DRAM device such as a DIMM is designated by "DQ". An example of how data is clocked according to the DDR SDRAM specification is shown in FIG. 1, where a DQS preamble 1 is shown, followed by clock cycles 10, 20 and 30, and followed by DQS postamble 2. The clock cycles 10, 20 and 30 includes rising edges 10R, 20R and 30R and falling edges 10F, 20F and 30F, respectively.

In double data rate reads, data is read both on the rising edge and the falling edge of a clock signal. Thus, in FIG. 1, data units (e.g. words, bytes, quad words, etc.) 40–90 are read out from the DRAM device on each edge of clock cycles 10–20. Data unit 40 is read out on the rising edge of clock cycle 10, data unit 50 is read out on the falling edge of clock cycle 10, data unit 60 is read out on the rising edge of clock cycle 20, etc.

The preamble 1 and postamble 2 are defined to be stable LOW states for the DQS signal. Before the preamble and after the postamble, the DQS signal is considered "tristate", meaning that it is not driven either high or low, and may fluctuate from one state to another. Because of this fluctuation, a DQS in tristate could corrupt the read data storage elements by driving them in an unpredictable fashion, e.g. during the postamble period, after a read data command has been issued but before the requesting device has captured the data read out from the DRAM device (e.g. in FIG. 1, before the requesting device has captured data unit 90).

This likelihood of corruption of data by a tristate postamble signal is increased in systems that use double data rate reads, such as in the manner specified in the JEDEC DDR DRAM specification. An architecture and method are therefore needed for such systems that will avoid this data corruption problem, without compromising the ability to read or write data at speeds otherwise allowed by a DDR scheme.

In particular, a design is needed that will prevent a postamble signal from driving memory devices that contain data read from or written to a DDR DIMM or other DDR device, before that data has been captured by the requesting device.

SUMMARY OF THE INVENTION

A circuit according to one embodiment of the invention is provided as part of a processor-based system, and comprises a masking circuit coupled at the DQS input to a data FIFO array for one or more requesting devices. The masking circuit is provided with an end-of-read signal by a memory controller of the system, and the end-of-read signal is ANDed with the DQS signal. The end-of-read signal is generated at a predetermined delay time after the data access request (e.g. a read command), with the delay time being determined in part by the size of the read request, the inherent latency of the system based upon topology, PVT (process, voltage, temperature), circuit layout, and other known variables.

The delay time is selected such that the end-of-read signal is generated during the last DQS signal for a given read command. The DQS signal is ANDed with this end-of-read signal, and when both go HIGH, followed by a falling edge of the DQS, this is used to disable an AND gate to the data FIFO array. Thus, the falling edge of the last DQS signal for the desired read command is itself used to disable the DQS input to the data FIFO array, and thereby to prevent subsequent corruption of the final data entering the array, before that final data has been read by the requesting device.

Another read command can then be executed by using a gate reset command to effectively reset the input circuit used to mask the DQS of the FIFO array during a preamble of the new command, and the process repeats for each such command.

The system and method described are equally applicable to any data access commands (e.g. write requests) where a tristate period is to be encountered before the data access request has been fulfilled with the requested data provided the requesting device.

Figure 1:
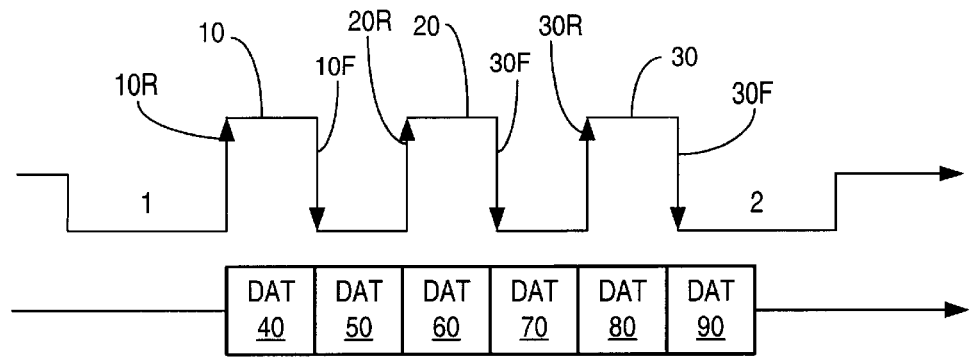
FIG. 1 is a timing diagram illustrating a double data rate command operation.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DESCRIPTION OF THE PREFERRED EMBODIMENTS

Figure 2:
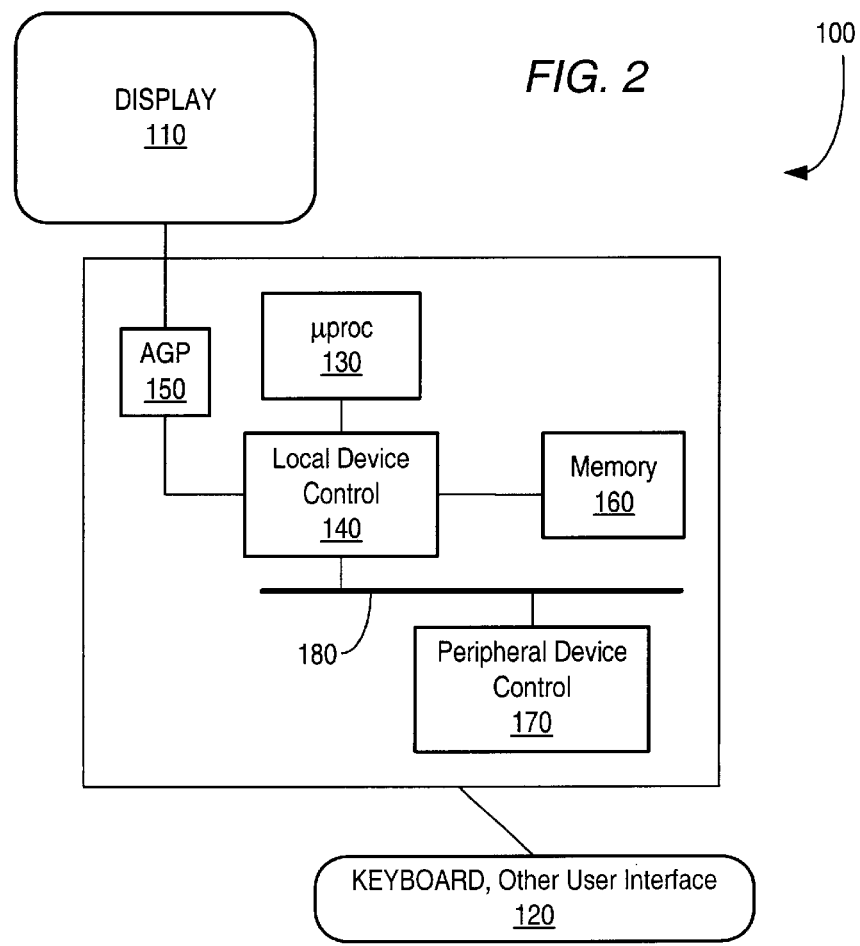
FIG. 2 is a block diagram of a system suitable for use with an embodiment of the present invention.

FIG. 2 illustrates a processor-based system 100, such as a workstation or a server, in connection with which an embodiment of the present invention may be used. The system 100 is coupled to a display 110, user interface device 120 (such as a mouse, keyboard, track ball, etc.), and operates under control of at least one microprocessor 130 (though it may be a multiprocessor system).

The processor 130 is connected to a local device control circuitry 140 (also referred to as a "host bridge), which includes circuitry that controls data and command exchanges with local devices such as the display 110 via an accelerated graphics processor (AGP) 150 and memory 160, which may in a typical system will include multiple DIMMs (dual in-line memory modules) or other suitable memory modules or media.

The local device control circuitry 140 is connected to a peripheral device control circuit 170 via a bus such as PCI bus 180.

The local device control circuitry 140 may in many respects include conventional or known circuitry (with the addition of the inventive features described below), but may in particular incorporate features of the design of system controller (e.g., "Northbridge" or AMD-762™ controller) circuits of Advanced Micro Devices, Inc. (AMD). The peripheral device control circuit 120 may likewise in most respects be conventional or known circuitry, but may incorporate features of AMD's peripheral bus controllers (e.g., the "Southbridge" or AMD-766™ controller).

Figure 3:
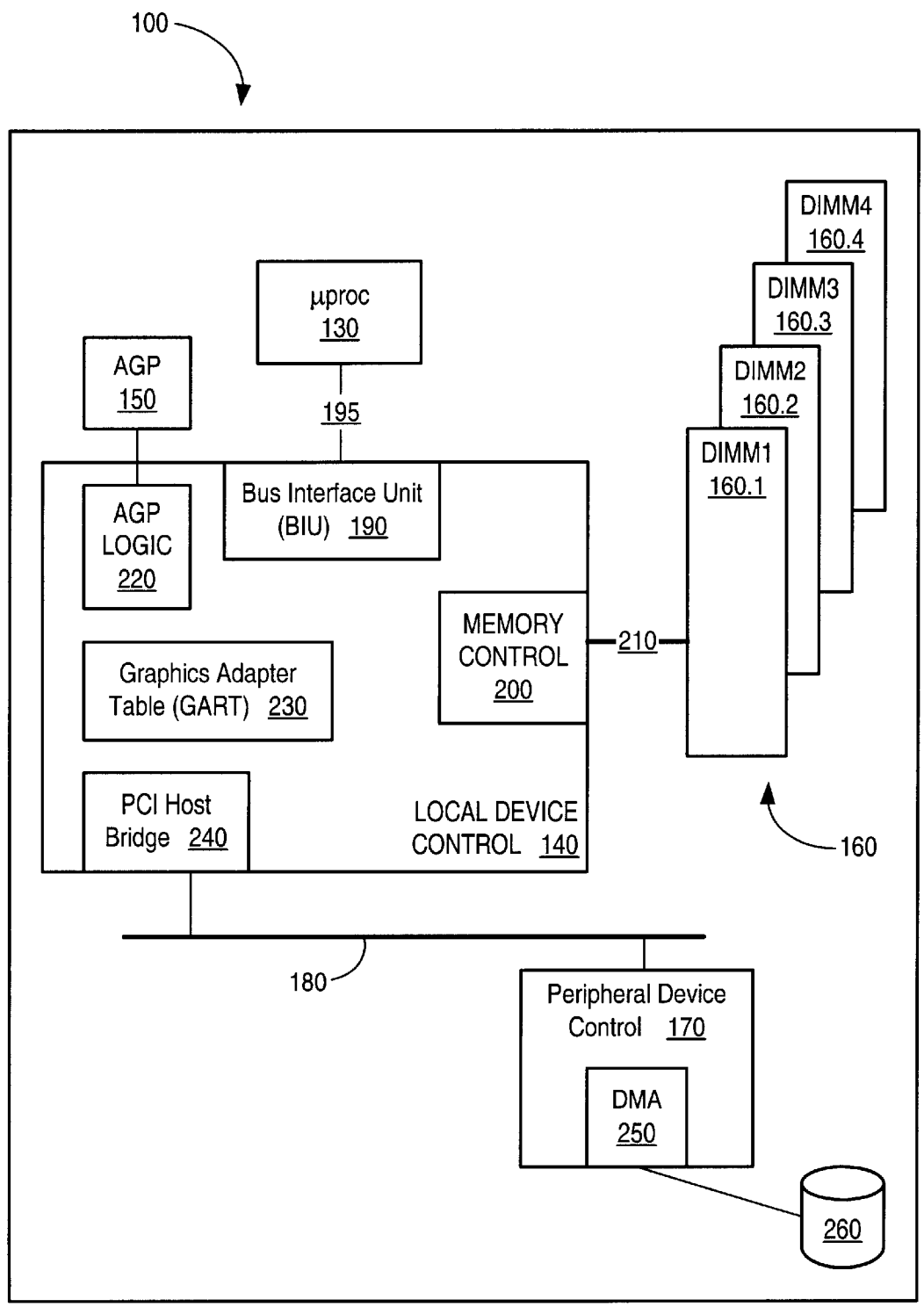
FIG. 3 is a block diagram showing details of a preferred embodiment of the system of FIG. 2.

FIG. 3 is a block diagram showing greater detail of the system 100 illustrated in FIG. 2, in particular with respect to the a local device control circuitry 140 (with some elements, such as the display and keyboard, omitted for clarity). The control circuitry 140 includes a bus interface unit (BIU) 190, which communicates via processor bus 195 with the processor(s) 130. In the case of an AMD system, the processor(s) may be one or more AMD-K7™ processors, while the bus 195 may be AMD's S2K™ bus, which is a widely known and used bus. Other processors and buses are usable in this setting.

The control circuitry 140 also includes AGP logic 220, configured to control the AGP 150 (which may comprise, e.g., a graphics card), a graphics adapter table (GART) 230, and a PCI host bridge circuit 240, connected to the PCI bus 180, configured to control access to the bus 180 and to the peripheral device control 170. Control 170 in turn includes logic and circuitry to control disk drives, e.g. DMA (direct memory access) engines, serial ports and so on, such as DMA control logic 250 governing operation of external disk drive(s) 260, in a conventional fashion.

The circuits or logic 190, 220, 230 and 240 all communicate with the memory controller 200; see description below of FIG. 5.

It should be understood for the purposes of the present description that the term "logic" may include hardware, software or firmware, as appropriate for the given operation or function, or any combination of these. Likewise, circuits and control hardware referred to herein may be any "logic" by this broad definition. In many cases, the same types of operations may be carried out by hardware, software, firmware or a combination thereof.

Figure 4:
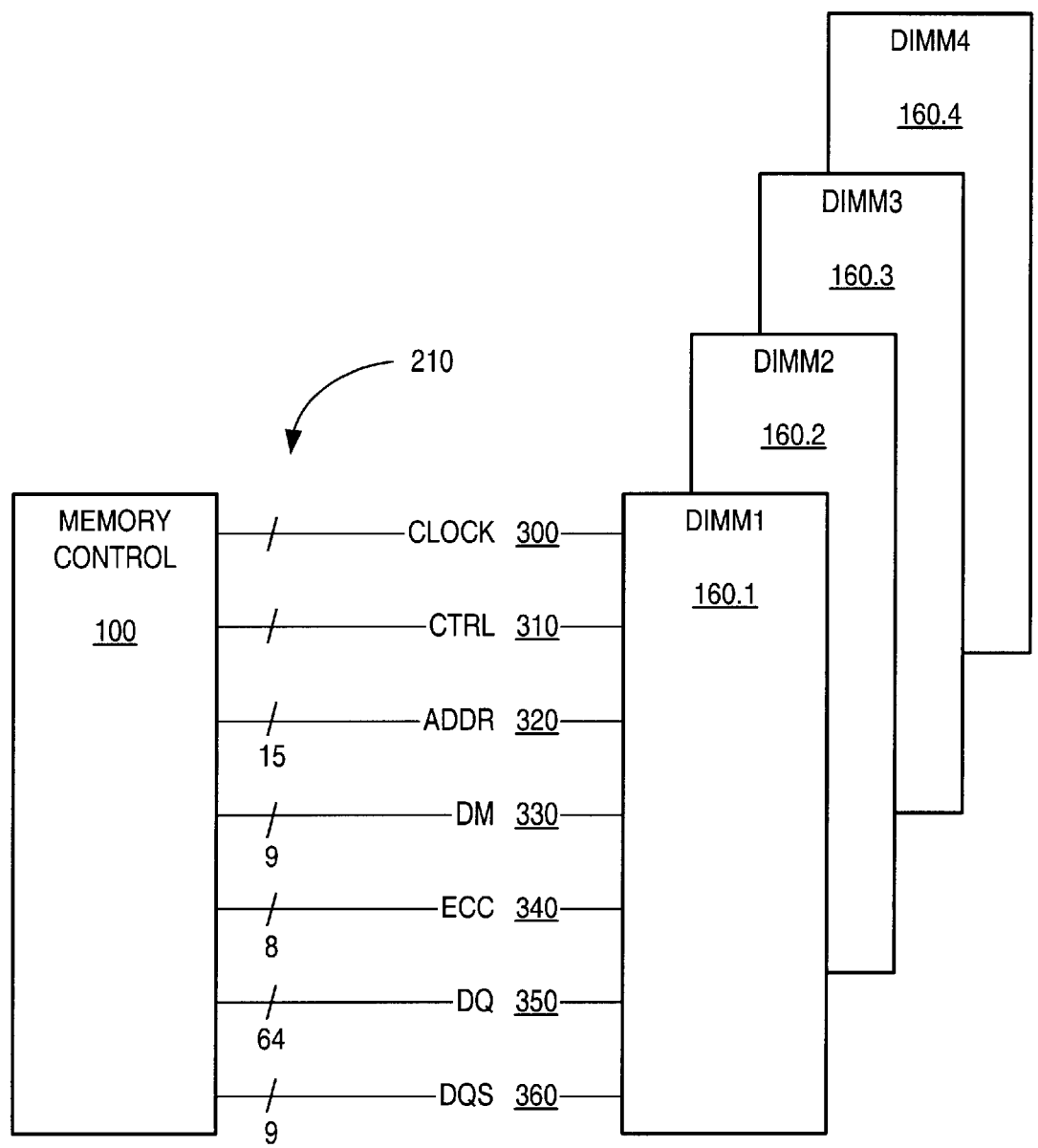
FIG. 4 is a block diagram of a subsystem of the system of FIG. 3.

The control circuitry 140 also includes memory control logic 200, which communicates with and controls the operation of memory devices, such as DIMMs 160 (identified as DIMM1, DIMM2, DIMM3 and DIMM4, numbered as items 160.1–160.4, respectively) via a bus 210. The bus 210 is illustrated in expanded form in FIG. 4, where it can be seen to include standard clocking, addressing, mask, data and data strobe lines and buses, such as clock bus 300, control bus 310 (which may be regarded as including clock bus 300), address bus 320, data mask bus (DM) 330, ECC (error correction code) bus 340, data bus (DQ) 350, and data strobe bus (DQS) 360. These and other conventional buses may form the bus 210. The present disclosure is directed primarily to operations relating to the buses 300 and 340–360 (clock, DQ, ECC and DQS).

The data bus 350 and data strobe bus 360 are bidirectional (while the address and control buses 310 and 320 will typically be unidirectional). The data strobe signal DQS can be driven from the memory controller during a write operation, and it is also the clock strobe that is forwarded by a DDR memory device (e.g. a DDR DRAM DIMM), along with the data, during a read operation.

The control bus 310 transmits such conventional commands as CAS (column address strobe), RAS (row address strobe), WE (write enable), chip select, etc. In the illustrated embodiment, there are eight chip selects: one for each of eight single in-line memory modules (SIMMs), or one for each of eight sides of four DIMMs.

The bus 210 and its component buses and lines are connected in parallel to DIMMs 160.1–160.4. Thus, a strobe appearing on the DQS bus 360 is transmitted to all four (or other number) DIMMs, and conventional chip select circuitry (not separately shown) determines which of the DIMMs should respond to the strobe. In general, all eight "chips" addressed by the chip select (e.g. SIMMs or sides of a DIMM) share the same buses for data strobe DQS, data DQ, ECC and mask bits, and they are able to be addressed separately because of the chip select operation. Thus, all of the memory "chips" see these various signals, but only the one with the active chip select (conventionally, a LOW signal) actually interprets the incoming commands.

The address bus 320, data mask bus 330 and ECC bus 340 are used in a conventional fashion (with ECC being used as data, like the DQ signals on the DQ bus).

Variations on the bus 210 are possible, but following is a description of a typical configuration. For a system reading 64 bits of data, a 64-bit data bus 350 is used, which can be accompanied by 8 bits of ECC, and thus ECC bus 340 is an 8-bit bus. Bits 0–7 of the DQS (data strobe) signal will be associated with bytes 0–7 of the data (on the DQ bus), while bit 8 on the DQS bus will be associated with the corresponding ECC bit for that byte of data.

Similarly, data mask bits 0–7 correspond to bytes 0–7 of the data on the DQ bus, with DM bit 8 corresponding to the ECC data.

Figure 5:
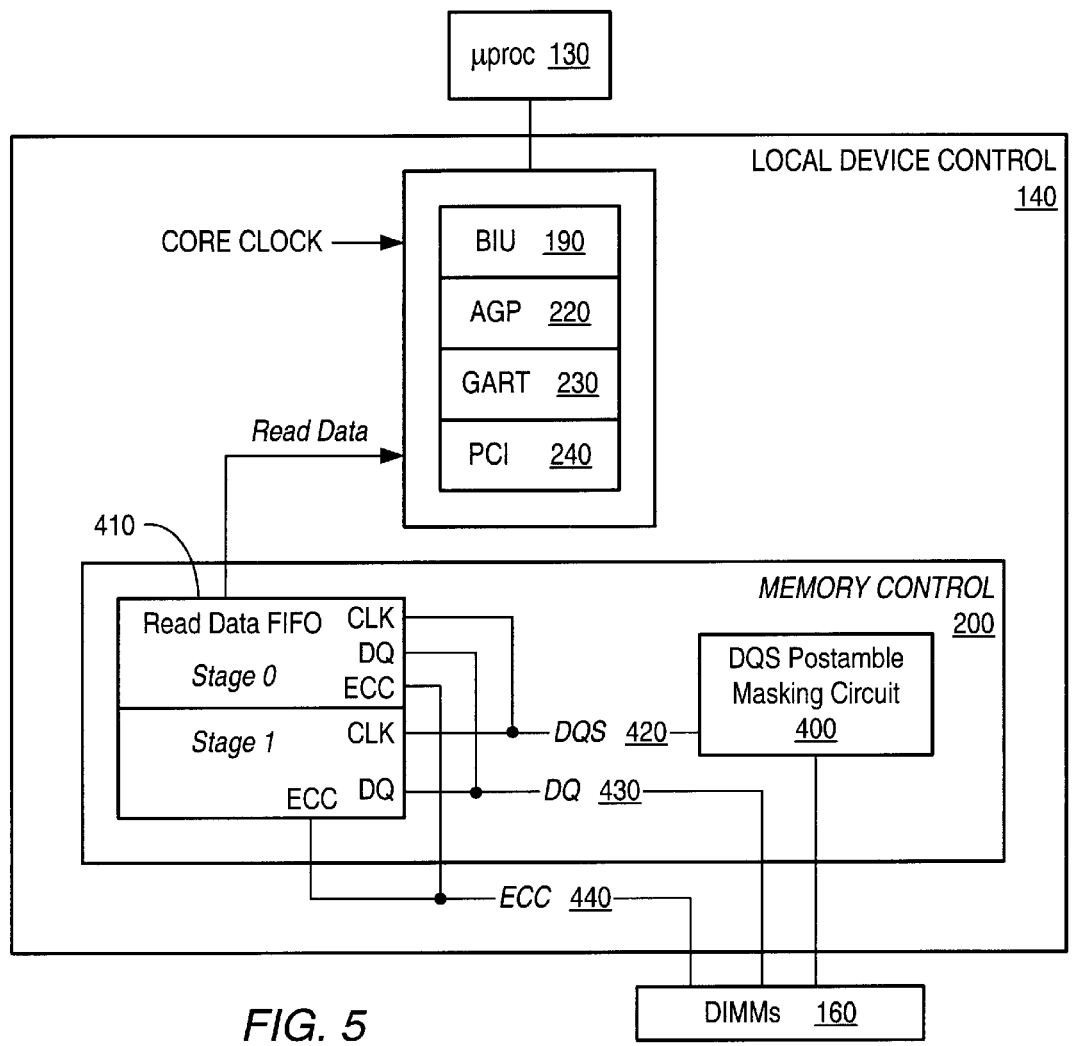
FIG. 5 is a block diagram of detail of the subsystem of FIG. 4.

FIG. 5 shows additional detail of a pertinent portion of the memory control 200, which is connected to the other logic units on board the local device control module, which is preferably formed as a single integrated circuit. The following description will use a read request coming from one of the logic units 190 or 220–240 to illustrate the operation of a system according to the present invention. However, the inventive concepts are applicable to many other types of requests, including write commands and other commands where memory or data access is requested, and some type of data is communicated from one device to another, most advantageously where there is a latency between the issuance of a request or a command and the return of data relating to that request or command.

Memory control 200 thus includes a DQS postamble masking circuit 400 and a read data FIFO array 410, connected in part by DQS (data strobe) bus 420, DQ (data) bus 430 and ECC (which, generally speaking, is also considered data) bus 440. These buses 420–440 are connected to stages 0 and 1 of the FIFO array 410, which is preferably at least a two-rank FIFO which receives data in both stages (or ranks). Thus, the information on these buses is stored in both stages 0 and 1. The data (including ECC) is provided to the requester, such as units 190 and/or 220–240, alternatingly from stages 0 and 1.

The operation of the postamble masking circuit 400 is described below with respect to FIG. 7, et seq.

Figure 6:
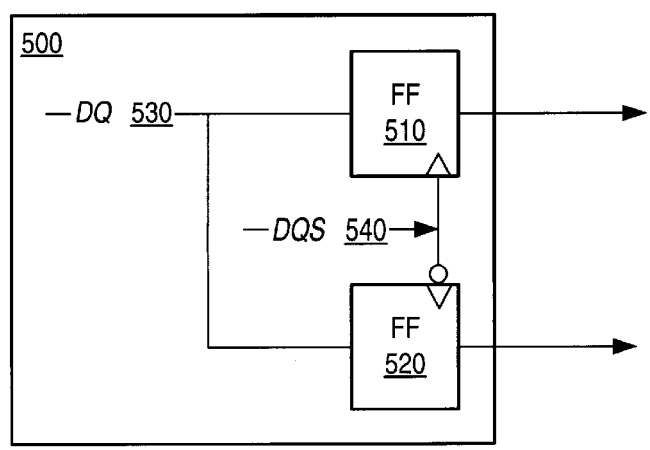
FIG. 6 is a circuit diagram of a portion of the FIFO array of FIG. 5.

FIG. 6 is a simplified circuit diagram of a portion of the read data FIFO array 410 for handling a single bit of the incoming data DQ. This subcircuit demonstrates how data is clocked on both rising and falling edges of the DQS strobe. Flip-flop 510 clocks data on a rising edge signal, and flip-flop 520 clocks data on a falling edge signal (as indicated by the inverter "bubble" on CLK). One bit of data present on DQ line 530 of subcircuit 500 appears at both flip-flops 510 and 520. The DQS strobe is asserted on line 540 alternatingly as a high (rising edge) and a low (falling edge) signal. Upon a rising edge, only flip-flop 510 is triggered, and thus whatever data appears on the DQ line connected to that flip-flop is passed through into the FIFO array 410. When the DQS strobe next goes low, the falling edge triggers flip-flop 510, by which time a new bit of data is present on the DQ line 530, and this new bit is thus captured by the FIFO array 410. The next assertion of a high signal by the DQS strobe captures the next bit of data via flip-flop 510, and so on. This operation is duplicated for all of the data lines (e.g. data plus ECC) for a given memory device. Thus, the read-out of the full width of data from a memory device occurs twice for each full cycle of the DQS strobe.

Masking DQS During Postamble—Circuits and Operation

Figure 7:
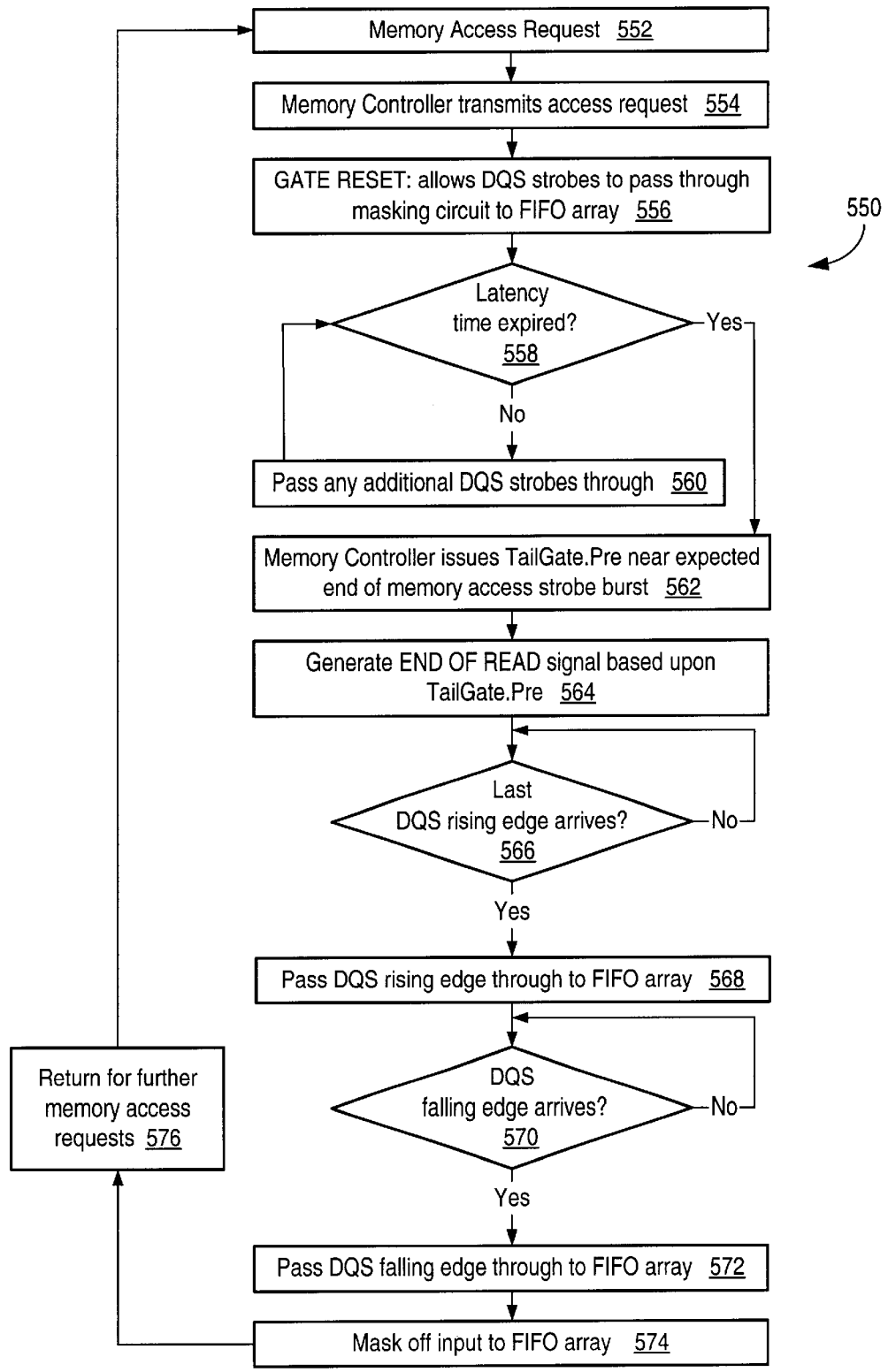
FIG. 7 is a flow chart illustrating the operation of a system according to an embodiment of the invention.

The general procedure of a system for preventing corruption of data due to a preamble state of the memory device strobe is shown in flow chart 550 of FIG. 7. When a memory access request is generated (box 552), the memory controller transmits the request to the appropriate device (box 554), and additionally issues a "gate reset" signal, which opens the postamble masking circuit 400 to allow DQS strobes to pass through, in a manner to be described below in connection with FIGS. 8 and 10.

There is a certain predicted latency time for the return of read data (e.g. for a read request), and as long as this time has not expired, DQS strobes are passed through to the FIFO array 410 (shown in FIG. 5), as indicated in boxes 558–560 of FIG. 7. However, when the memory access strobe burst (e.g. of four clock cycles) is nearing completion, the memory controller issues a signal (designated TailGate.Pre in box 562), which is used to generate an end of read signal (box 564), in a manner described below in connection with FIGS. 8 and 9.

The rising edge of the last cycle of the DQS strobes in the memory access burst is passed through (see boxes 566–568). The arrival of the falling edge of that same last DQS strobe is detected (box 568), and is passed through to the FIFO array (box 570). The end of read signal is used in conjunction with that falling edge to generate a signal that masks off the input to the FIFO array (box 574). Since the DQS signal will then go tristate (after a predetermined postamble period, e.g. as specified by a DDR device), this masking step prevents the spurious driving of the FIFO array described above, thus allowing the requesting device to capture the returned data without corruption.

In general, in the operation of a processor-based system there will be numerous successive memory access requests. Thus, at box 576 the procedure returns to box 552 to process any further access requests.

Several operations are important to carrying out the inventive method, including: (1) generating an end of read signal to substantially coincide with the last DQS strobe of a returned memory access request; (2) using that end of read signal to mask off the input to the FIFO array to prevent data corruption; and (3) maintaining the masked-off state until another memory access request occurs. Each of these operations is now described.

The Masking Circuit

Following is a description of the general principle of operation of the masking circuit 400, followed by a description in detail of circuitry suitable for accomplishing this operation (FIG. 8) and timing diagrams (FIGS. 9 and 10) illustrating the procedure.

In order to ensure that the postamble following a burst of DQS strobes does not continue to drive the FIFO array 410, that postamble is in one embodiment masked off from reaching the FIFO array at all. This is accomplished by generating an end of read signal, which is a single-pulse signal coinciding substantially with the last DQS cycle of the read (or write) burst. The falling edge of the last DQS signal is ANDed with the end of read signal, which is used to mask off the input to the FIFO array. The end of read signal then goes LOW, which maintains the masking function until the next gate reset signal opens it up again for a new read burst.

Thus, the FIFO array cannot receive DQS signals when the DQS is in a tristate, which ensures that the data present in the FIFO array, being captured by the requesting device, is uncorrupted by false strobes.

The following description will be in the setting of a read operation, but it will be understood that the inventive concepts are equally applicable a write operation, or any information transfer operation where a fluctuating signal (such as a tristate) is possible and should be prevented from interfering with accurate transfer of information (including data, commands, etc.). Thus, in general the "end of read" signal can be regarded as an "end of transfer" signal, referring to any transfer of information in response to a data transfer request of a requesting device.

Generating an End of Read Signal

Figure 8:
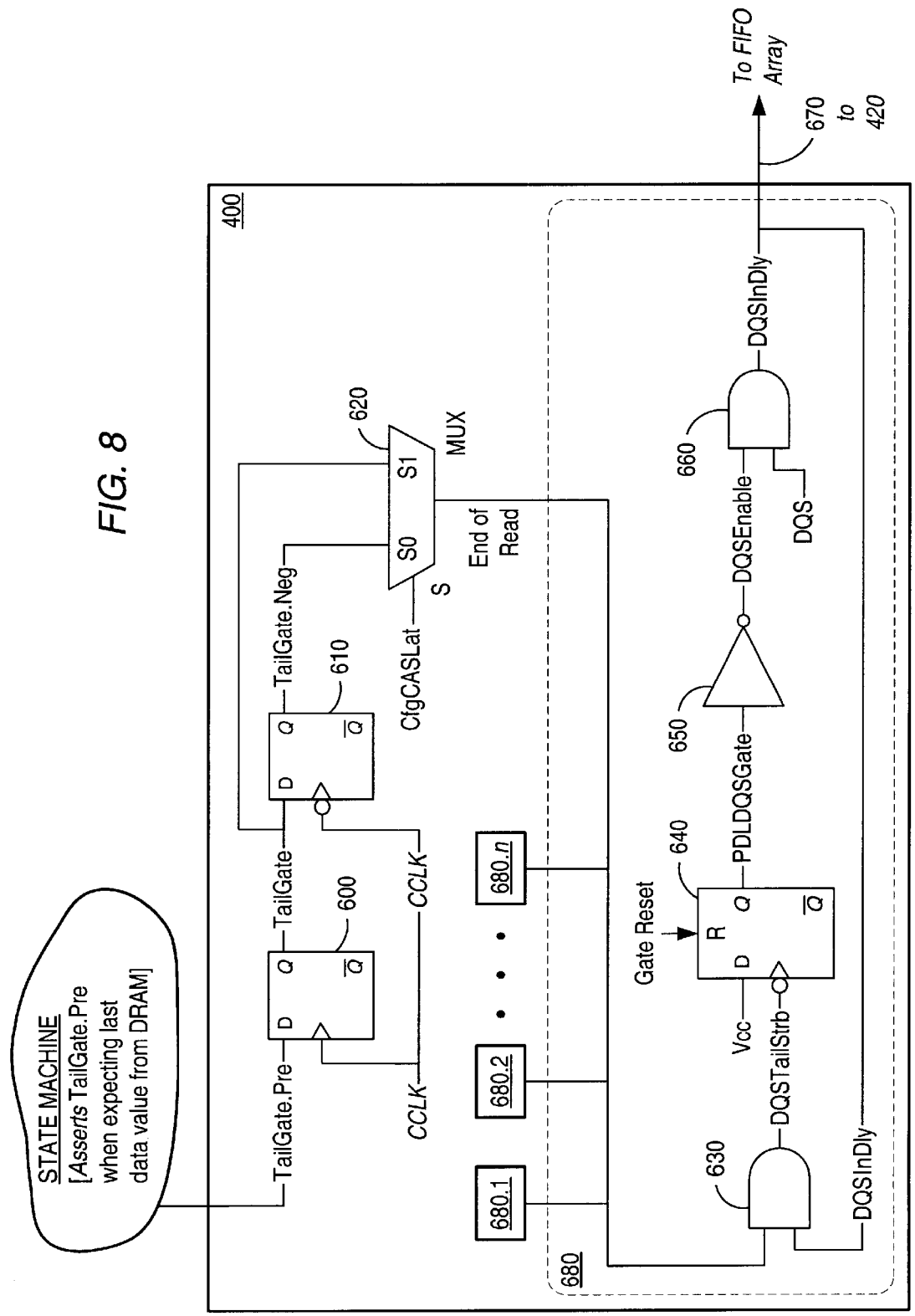
FIG. 8 is a circuit diagram of a masking circuit in accordance with an embodiment of the present invention.
Figure 9:
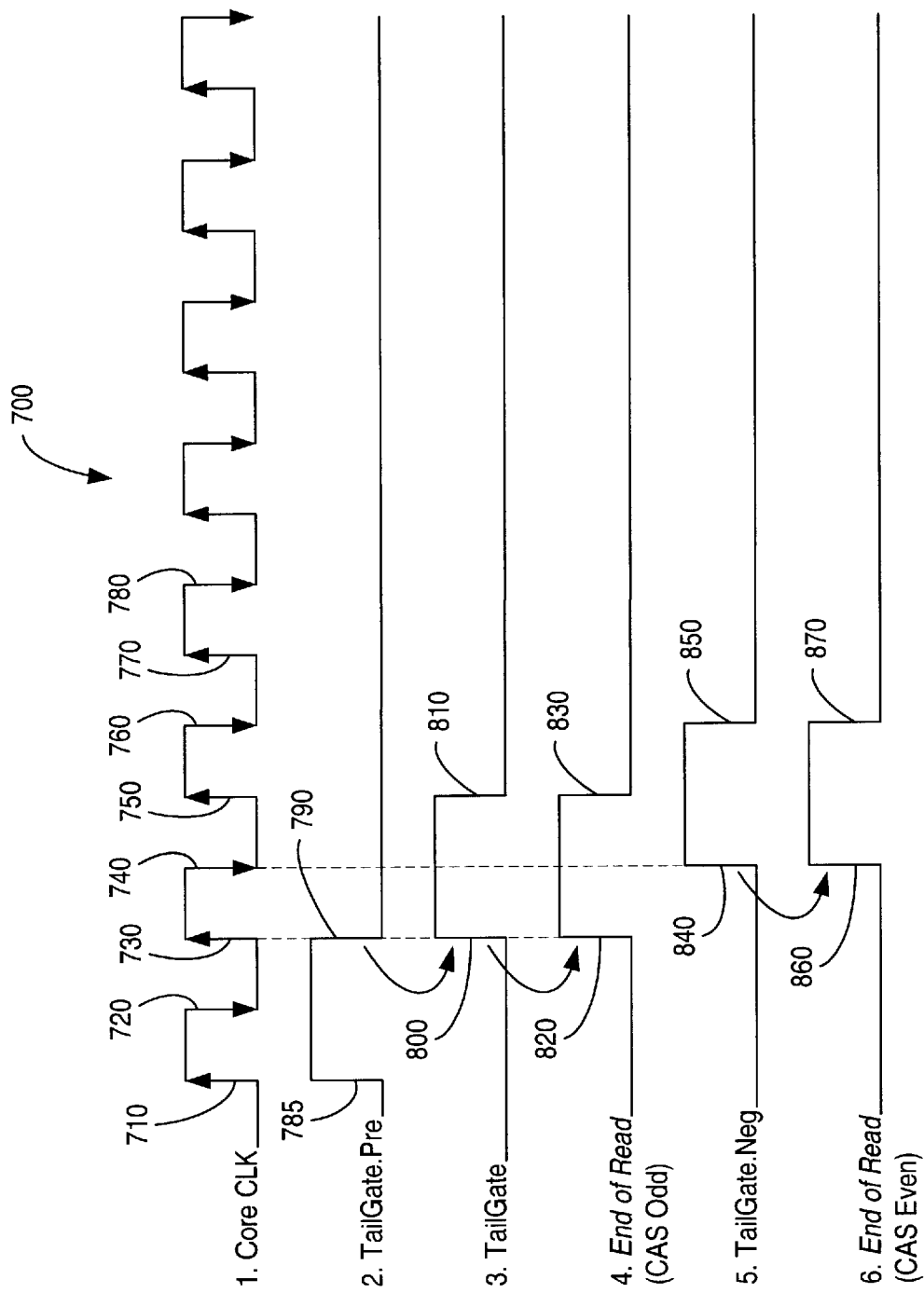
FIG. 9 is a timing diagram pertaining to a portion of the circuit shown in FIG. 7.

FIG. 8 shows details of the DQS postamble masking circuit 400 (see also FIG. 5) suitable for implementing the present concepts, and FIG. 9 is a timing diagram 700 illustrating the operation of circuit 400. Circuit 400 has as an input a signal designated "TailGate.Pre", short for RdWrPtrTailGate.Pre, for read-write pointer tail gate signal—the "pre" being a conventional suffix indicating that it is the previous cycle's value going into, e.g., a flip-flop.

A DQS masking circuit 400 subcircuit 680 is used for each DQS signal. There may be, for a given system, nine such signals (as on the DQS bus 360 in FIG. 4); or for a ×4 ("by 4") system, there may be eighteen such signals. For each such signal (i.e. each bit of the DQS signal), the subcircuit 680 is replicated (as indicated by additional subcircuits 680.n (i.e. 680.1, 680.2 . . . 680.n) in FIG. 8). Each subcircuit 680.n then corresponds to one byte (for a ×8, ×16, etc. system) or one nibble (for a ×4 system) of the actual DQ.

This TailGate.Pre signal occurs at an expected data arrival time signal asserted by the system (or a state machine of the system) at a time that the system determines that the last data value from the memory device (e.g. DRAM) should arrive. In particular, the signal TailGate.Pre is asserted after a known latency time, which may be a few nanoseconds, or in the present example about one clock cycle (where each clock cycle is about approximately 7.5 ns for a memory controller running at 133 MHz).

Determination of the latency is specific to each architecture and system, and it is well known that a certain latency time must be waited before a requesting device will receive the requested data.

As discussed in further detail below, the end of read signal should be timed such that its rising edge occurs at about the same time as the falling edge of the last DQS strobe for a given read burst. The circuit at the top of FIG. 8 accomplishes this. The memory controller issues a read request originating in a requesting device (e.g. the BIU, AGP, GART or PCI shown in FIG. 5), and waits a predetermined time, determined by the circuit characteristics of the system (process, voltage, temperature, path lengths), the size of the memory access request (e.g. one quad word, eight quad words, etc.), and any other factors that may delay the response time of the memory device. Such delays can be both calculated in advance, based upon known factors, and determined empirically on an actual system, or combination thereof. Typical request latencies may be between from one and ten nanoseconds.

The TailGate.Pre signal is thus generated at a rising edge 710 of the core clock (see line 1 of FIG. 9), where the particular clock cycle is selected for the latency of the system as described above. This generates the TailGate.Pre signal (line 2 of FIG. 9), which in a preferred embodiment is configured to last one full clock cycle, with rising edge 785 substantially coinciding with rising edge 710 of the core clock, and with falling edge 790 substantially coinciding with rising edge 730 of the core clock. Succeeding clocks are shown as clock cycles 750–760, 770–780, etc.

The TailGate.Pre signal is provided as an input to a positively driven flip-flop 600 (shown in FIG. 8), which is clocked by the core clock CCLK as shown, and thus passes the signal through as TailGate (line 3 in FIG. 9), whose rising and falling edges 800–810 substantially coincide with the next full clock cycle 730–740 (until rising edge 750 begins). (The timing diagram 700 is somewhat idealized; in actual operation, normal delays such as flip-flop throughput time will be present.) The TailGate signal is itself provided as an input to negatively driven flip-flop 610, which is clocked by the inverse of the core clock CCLK, as indicated by the inverting "bubble" and the clocking input.

Thus, the output signal (TailGate) of flip-flop 600 is a one-cycle pulse, since it is clocked by two successive rising edges of the core clock. Similarly, the output signal TailGate.Neg of flip-flop 610, shown in line 5 of FIG. 9, is also a one-cycle pulse, but with rising and falling edges 840–850 one-half cycle delayed relative to the TailGate signal edges 800, due to the operation of flip-flop 610.

These signals, TailGate and TailGate.Neg, are provided as input signals S0 and S1 to MUX 620 shown in FIG. 8. The select input S to MUX 620 is derived from the system's CAS latency, which may be even or odd. Thus, when the system is booted, in conventional fashion it sets a signal CfgCASLat, whose value determines on the CAS latency of the system. For instance, if CAS latency is 2 or 3, this is "even" CAS latency, and CfgCASLat will be set to LOW at all times, resulting in the selection of signal S0 at the MUX 620. If CAS latency for the system is 2.5, e.g., then this is "odd" CAS latency, and CfgCASLat will be set to HIGH during the operation of the system, resulting in the selection of signal S1 at the MUX 620.

Accordingly, for a system with even CAS latency, the signal TailGate.Neg is passed through MUX 620 and becomes the End of Read signal, with rising and falling edges 820–830; and for a system with odd CAS latency, the signal TailGate is passed through MUX 620 and becomes the End of Read signal, with rising and falling edges 860–870.

Since there is a certain amount of unpredictability in the latency time for a memory device to return data and DQS signals on a read request, there is always the risk of attempting to capture the returned data outside a window in which the memory device can provide it. If the above circuit were not used, then this unpredictability would be compounded, since another half-cycle of uncertainty could be caused by generating an end of read signal without taking into account the CAS latency of the system. In a system whose memory controller is running at, e.g., 133 MHz, this could cause about a 3.75 nanosecond uncertainty, which is eliminated by the use of the circuitry of FIG. 8.

Using the End of Read Signal to Mask off FIFO Array Input

The end of read signal is used as an input to the circuit in the lower portion of FIG. 8, whose operation is now described in connection with timing diagram 900 shown in FIG. 10.

Figure 10:
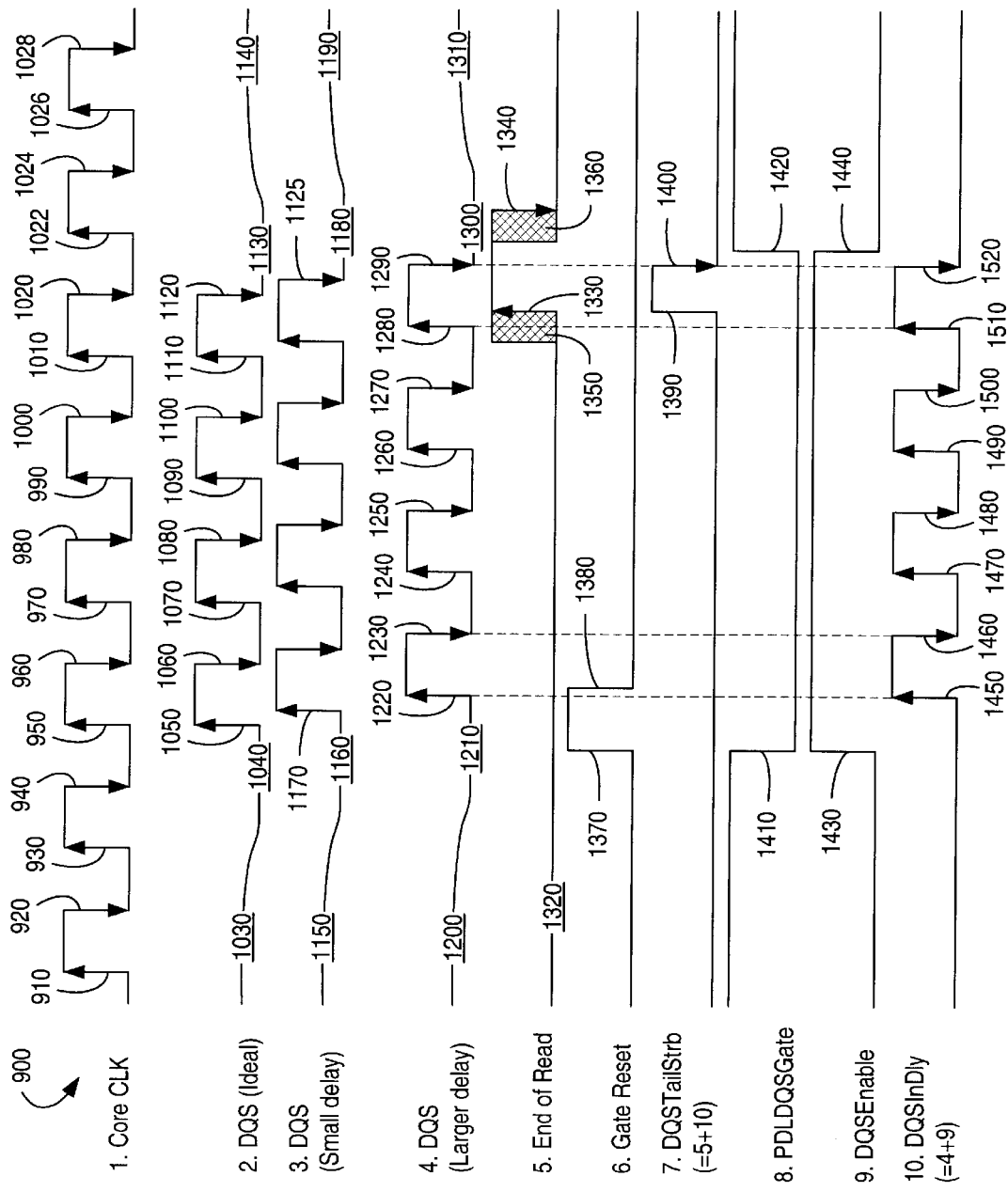
FIG. 10 is a timing diagram illustrating the operation of a preferred embodiment of the present invention.

The core clock provides persistent clocking signals 910–920, 930–940, etc. as shown in line 1 of FIG. 10. For this example, it will be assumed that the memory controller issues a read command that is sampled by the DDR device with rising edge 910 of clock cycle 910–920, and that the memory access latency is about two cycles long (in this case, assuming a CAS latency of 2). In general, while clock cycles 910–920 and 930–940 are being generated, the DQS signal from the memory device (e.g. the accessed DIMM) will be in a tristate, as shown at 1030 in line 2 of FIG. 10. In the preamble phase 1040 of the DQS signal, it is driven low.

After the memory access latency period, the memory controller then begins to receive the returning data (DQ and ECC) and data strobe (DQS) signals from the accessed DIMM. This begins to occur approximately at the time of clock cycle 950–960, i.e. two cycles after clock cycle 910–920, as shown in line 2 (DQS Ideal, cycle 1050–1060)) of FIG. 10.

In practice, there will be a certain delay of the DQS strobe relative to rising edge 950. Thus, DQS strobe cycles 1050–1060, 1070–1080, 1090–1100 and 1110–1120 may be delayed slightly, such that they actually appear after tristate 1150 and preamble 1160 as strobes 1170. In this case, the slightly delayed DQS has a postamble 1180 and again goes into tristate 1190.

Line 4 of FIG. 10 shows the same DQS signal delayed slightly longer, with tristate 1200; preamble (driven low) 1210; four strobe cycles 1220–1230, 1240–1250, 1260–1270 and 1280–1290 (corresponding to "ideal" strobes 1050–1060, 1070–1080, 1090–1100 and 1110–1120); postamble (driven low) 1300; and again a tristate 1310. The ensuing description is made with reference to the longer-delayed DQS signal referred to in line 4 of FIG. 10, for the sake of the example, but is not confined to a DQS of any specific delay.

The "consume" cycles of the read operation, i.e. the clock cycles during which the requesting device is actually capturing the returned data, occur yet later, e.g. two cycles later in FIG. 10, at cycles 990–1000, 1010–1020, 1022–1024 and 1026–1028. Note that the third and fourth of these "consume" cycles occur while the DQS (either ideal or delayed) signal goes into its postamble and tristate phases (1130–1140, 1180–1190 or 1300–1310). Unless these phases are masked off—particularly, the tristate—the DQS strobe will continue to drive the FIFO array 410 even as data is being captured (from stage 0 or stage 1) by the requesting device, and thus spurious data will be provided to the requesting device.

The DQS signals 1220–1230, etc., including the postamble 1300 and tristate 1310 (using the example of a longer-delayed DQS signal in line 4), are provided as inputs to AND gate 660 (see FIG. 8), whose other input is a signal DQSEnable. When DQSEnable is high, the DQS signal is allowed to pass through to the FIFO array, as indicate by arrow 670 (thus appearing as the DQS signal on bus 420 in FIG. 5). Thus, the challenge is to generate such a DQSEnable signal that the FIFO array input is masked off during the correct intervals, such as during postamble 1300 and tristate 1310, while the requesting device is still in the "consume" mode during clocks 1022–1024 and 1026–1028. The following description of a full read operation shows how this is achieved.

When a read request is issued, the memory controller waits the appropriate latency period and then issues a Gate Reset signal 1370–1380 (see line 6 of FIG. 10), which is provided as an asynchronous reset input to a negatively driven flip-flop 640 in FIG. 8. (Note that the gate reset pulse 1370–1380 slightly precedes the first "ideal" DQS 1050–1060 in line 2 of FIG. 10.) This resets the flip-flop 640 (regardless of its previous state or any inputs that may be present), causing the signal PDLDQSGate to go LOW. This low signal is inverted by inverter 650 and becomes DQSEnable (line 9 of FIG. 10), and thus appears as a high signal at the input to AND gate 660.

The AND gate 660 now acts to pass the rising and falling (i.e. DQS) edges of a DQS signal through as DQSInDly (line 10 of FIG. 10). Note that the input of the flip-flop 640 is kept high (the Vcc being coupled to the D input). The PDLDQSGate signal remains low until DQSTailStrb goes low (note the inversion "bubble" at the flip-flop 640), which occurs when DQSInDly goes low (see AND gate 630 and falling edge 1520 in line 10 of FIG. 10). Since the DQSEnable signal is the inverse of PDLDQSGate, DQSEnable remains high until DQSInDly and End of Read are both high, at which point it goes low. See lines 8 and 9 of FIG. 10.

Thus, as long as DQSEnable remains HIGH, DQS strobes pass through AND gate 660 onto line 420 as the DQSInDly signal (line 10 of FIG. 10; see also FIGS. 8 and 5), enabling the FIFO array as described above. Thus, the DQSInDly signal in line 10 of FIG. 10 is the same as the DQS signal (line 4 of FIG. 10 for this example) which was provided as input to AND gate 660, as long as DQSEnable is HIGH. Accordingly, DQS strobe cycles 1220–1230, 1240–1250, 1260–1270 and 1280–1290 of FIG. 10, line 4 are passed through as delayed DQS (renamed DQSInDly) strobe cycles 1450–1460, 1470–1480, 1490–1500 and 1510–1520, respectively, of FIG. 10, line 10.

The memory controller receives the information of the size of the memory request from the requesting device, and uses this information, along with latency information, to predict the approximate time of the final DQS strobe falling edge for the memory access burst—in this example, the falling edge 1290 in line 4 of FIG. 10. The end of read signal described above is ideally generated at a time selected such that its rising edge 1350 occurs slightly before the falling edge 1290 (or 1120 or 1125, as the case may be).

In line 5 of FIG. 10, the end of read signal rising edge 1330 is shown to occur slightly after the rising edge 1280 of the last DQS strobe of the burst, and the falling edge 1340 is generated during postamble 1300 (before the tristate 1310 occurs). If necessary, additional delay times 1350 and 1360 are used to ensure that this is the case, i.e. to bring the rising and falling edges into the correct time frames. In practice, rising edge 1350 can actually occur slightly before rising edge 1280, since it is the falling edge 1340 of the end of read signal that is important in masking off the DQS tristate. However, care must be taken that the end of read does not occur before the falling edge 1270 of the penultimate DQS strobe 1260–1270, or the DQS signal will be masked off prematurely, and strobe 1280–1290 will not reach the FIFO array.

Since generating the end of read signal itself takes a certain finite amount of time, the memory controller must begin generating TailGate.Pre (see FIG. 9) at the appropriate time to anticipate this, i.e. must select clock cycle 710–720 in such a manner that the end of read signal which is output from MUX 620 (FIG. 8) has a rising edge 1330 (FIG. 10, line 5) at about the time of rising edge 1280 (FIG. 10, line 4). While there may be many variables involved, such determinations (i.e., timing system events to accommodate latency periods) are essentially straightforward and well-known operations.

Given a HIGH end of read signal at the input to AND gate 630 in FIG. 8, and in addition a HIGH DQSInDly signal, such as rising edge 1510 (corresponding to rising edge 1280) in FIG. 10, the output DQSTailStrb of AND gate 630 goes HIGH (see rising edge 1390 in line 7 of FIG. 10). Since the flip-flop 640 is negative-edge triggered, the output PDLDQSGate is LOW, i.e. remains unchanged as shown in FIG. 10, line 8. (It was already LOW due to the gate reset operation, described above.) The DQS signal thus continues to pass through AND gate 660.

While the end of read signal is HIGH, the next DQS falling edge 1290 is passed through AND gate 660, and is fed back as DQSInDly falling edge 1520 to the AND gate 630. This causes DQSTailStrb to go LOW (shown as falling edge 1400 in line 10 of FIG. 10). This falling edge strobes the flip-flop 640, producing a HIGH PDLDQSGate signal (see rising edge 1420 at FIG. 10, line 8). Inversion by the inverter 650 produces falling edge 1440 of the DQSEnable signal (FIG. 10, line 9), and thus the output DQSInDly of gate 660 is thereafter maintained LOW, until Gate Reset is asserted for the next cycle, to once again open the PDLDQSGate to allow DQS to pass through.

Disabling (i.e. driving LOW) this DQSEnable signal masks off any DQS signals appearing at the input to AND gate 660, including any remaining postamble 1300 and the subsequent tristate signal 1310 (FIG. 10, line 4). The requesting device is thus able to capture information latched into the FIFO array without the possibility of fluctuating tristate signals from the DQS driving the FIFO array in an unpredictable or random manner, and corrupting the data.

Maintaining the Masked-Off State Pending a Subsequent Memory Access Request

The DQSEnable signal will remain LOW as long as the output PDLDQSGate of flip-flop 640 is HIGH. With the end of read at a LOW state, this will continue to be the case—i.e., flip-flop 640 will continue to produce a HIGH output, since it is triggered only by a falling edge of DQSTailStrb—until the flip-flop is reset.

As discussed above, the reset operation for flip-flop 640 occurs when the gate reset signal is provided at its input R (note that the Vcc input is HIGH as long as the system is on). Using this combination of the gate reset signal and end of read signal as described, then, it will be seen that the DQS strobes generated by a given memory device for a requested memory operation are provided as input to the FIFO array 410 only for the desired duration, i.e. for the length of the required memory burst (here, four clock cycles). During postamble, the DQS signals are masked off, preventing them from reaching the FIFO array, which is only provided with a LOW signal at input 420.

A subsequent read access operation will cause the memory controller to generate a new gate reset signal as described above, and the procedure begins anew (see boxes 576 and 552 in the flow chart of FIG. 7). Note that the FIFO array has been described in terms of an input to a requesting device, but it could of course be an output from a device, and the masking function would work in the same way. In general, for the purposes of this disclosure one may use the term data transfer "gate" for any data transfer device, including an input, an output, a router, a bridge, a hub, etc.

The procedure described above is also applicable to operations that require a number of clock cycles other than the four cycles for an eight-quad-word read operation used for the example. For example, read operations that take only one, two or three clock cycles, whether executed separately or in a pipelined fashion, will also operate correctly using the inventive concepts.

Conclusion

The circuitry and method of operation described above allow a complicated memory subsystem, with signals driven over buses rather than point-to-point as in simpler systems, to operate successfully and in particular without the corruption of data that could occur due to fluctuating (tristate) signals appearing on such a bus. In particular, the procedure of executing a read request according to one embodiment of the present invention has been described.

However, as noted the procedure and logic of the described system are equally applicable to other operations, such as write requests. Thus, while the inventive concepts have been arrived at to solve the specific problem of preventing spurious DQS strobing on a DQS bus during postamble tristates in the setting of a double date rate (DDR) memory subsystem, the principles and operation of the inventive concepts are more broadly applicable. For instance, though in many subsystems the data is allowed to float while the data strobe is not (particularly, where there are point-to-point connections), there may be situations where it is desirable to mask off the data in addition to, or alternatively to, the data strobe. The described features are applicable to such a situation, and indeed is applicable to any operation where it is desired to mask off an incoming signal that appears on a line or a bus as an input to a device whose information might be corrupted by receipt of the signal.

What is claimed is:

1. A data transfer subsystem configured to control passage of data through a data transfer gate in communication with a requesting device in a processor-based system, including:
   data transfer logic configured to generate a data transfer command in response to a data transfer request by the requesting device;
   data mask logic configured to generate an end of transfer command upon completion of the data transfer; and
   a masking module coupled to a data strobe input of the data transfer gate, wherein the masking module is configured to mask a data strobe signal conveyed to the data strobe input responsive to the data mask logic generating the end of transfer command.

2. The data transfer subsystem of claim 1, wherein data transfer logic is configured to generate the data transfer command after a delay following the data transfer request, where the delay is determined at least in part upon an empirically determined system latency for return of data transfer requests.

3. The data transfer subsystem of claim 1, wherein the data mask logic is configured to generate the end of transfer command after a data transfer period determined at least in part by an amount of data requested in the data transfer request.

4. The data transfer subsystem of claim 1, wherein the masking module includes a blocking logic configured at least in part to pass data through the data transfer gate only when a strobe enable signal is active at the blocking logic.

5. The data transfer subsystem of claim 4, wherein the blocking logic is configured to drive the strobe enable signal active at least in part in response to the data transfer command.

6. The data transfer subsystem of claim 4, wherein the blocking logic is configured to drive the strobe enable signal inactive at least in part in response to the end of transfer command.

7. A masking circuit configured for use in conjunction with a memory controller of a processor-based system, the masking circuit configured to control operation of a data transfer gate coupled to a requesting device of the system, the requesting device being configured to issue data transfer requests, including:
   first logic configured to generate an end of transfer signal at an end of transfer time after issuance of a data transfer request by the requesting device;
   second logic configured to enable transfer of requested data through the data transfer gate during a transfer period ending substantially at the end of transfer time, and further configured to mask a data strobe signal responsive to generation of the end of transfer signal.

8. The masking circuit of claim 7, wherein the first logic is configured to generate the end of transfer signal based upon a type of CAS latency for the system.

9. The masking circuit of claim 8, wherein the first logic is configured to generate the end of transfer signal based upon a time signal received at the masking circuit at substantially the end of transfer time, the first logic including:
   a first latching device receiving the time signal and clocked by a clock signal of the system, and having as an output a first output signal driven in response to the clock signal being driven high;
   a second latching device receiving the time signal and clocked by the clock signal of the system, and having as an output a second output signal driven in response to the clock signal being driven low; and
   a multiplexer receiving the first and second outputs as inputs, and having a select line connected to a system CAS signal indicating whether the CAS latency for the system is even or odd.

10. The masking circuit of claim 9, wherein the first output signal is selected at the multiplexer when the CAS signal indicates odd CAS latency, and the second output signal is selected at the multiplexer when the CAS signal indicates even CAS latency.

11. The masking circuit of claim 7, wherein:
   the transfer gate includes a FIFO configured to transfer data to and from the requesting device; and
   the second logic includes an AND gate having the data strobe signal as one input and a data strobe enable signal as another input, and having its output coupled to the FIFO, the FIFO being configured to block the data strobe signal in response to a blocking state of the AND gate output.

12. The masking circuit of claim 11, wherein the second logic further includes a latching device configured to drive the data strobe enable signal active during the transfer period, and to drive the data strobe enable signal inactive upon receipt of the end of transfer signal.

13. The masking circuit of claim 12, wherein the latching device is further configured to maintain the data strobe enable signal in an inactive state until a subsequent transfer request is made.

14. A memory controller in a processor-based system, including:
  a data transfer device coupled to an a data requesting device communicating with the processor-based system;
  a blocking circuit coupled to the data transfer device, including a gate having as one input a data signal and as another input a data enable signal, the blocking circuit being connected to an output of the gate; and
  first logic configured to drive the data enable signal active upon receipt of a transfer gate reset signal, and thereafter to drive the data enable signal inactive upon receipt of an end of transfer signal;
  wherein the gate is configured to provide an active output to enable transfer of data through the blocking circuit when the data enable signal is active, and is further configured to provide an inactive output to block transfer of data strobes through the blocking circuit when the data enable signal is inactive.

15. The memory controller of claim 14, wherein the data signal includes a data strobe signal coupled to an a first bus connected to the data requesting device, and the data enable signal includes a data strobe enable signal coupled to a second bus coupled to the data requesting device.

16. The memory controller of claim 15, further including second logic configured to generate the end of transfer signal at a time before the data strobe signal is in a tristate phase.

17. The memory controller of claim 15, wherein at least a first memory device and a second memory device are coupled to the bus, and further including second logic configured to generate the end of transfer signal at a time after completion of a data transfer relating to the first memory device but before commencement of another data transfer request for a new data transfer relating to the second memory device.

18. A processor-based system, including:
  a plurality of data requesting devices configured to issue data requests;
  a memory controller coupled to the plurality of data requesting devices;
  a plurality of memory devices coupled to the memory controller via a bus and accessible by assertion of a memory device select signal provided by the memory controller; and
  a blocking circuit coupled to the memory controller, configured to receive signal transfers to and from the memory devices via the bus and having at least a first state in which signal transfers through the blocking circuit are enabled and a second state in which signal transfers through the blocking circuit are disabled;
  wherein the memory controller includes logic configured to place the blocking circuit in the first state in response to a first data request issued by one of the data requesting devices, and to place the blocking circuit in the second state during a postamble time after completion of the data request;
  wherein the signal transfers comprise data strobe signal transfers which are inactive during the postamble time.

19. The system of claim 18, wherein the data strobe signal transfers enter a tristate phase after the postamble time.

20. A memory controller coupled to a processor-based system having a plurality of data requesting devices and a memory controller coupled to a plurality of memory devices via a bus, including:
  a blocking circuit coupled to the memory controller, configured to receive signal transfers to and from the memory devices via the bus and having at least a first state in which data strobe signal transfers through the blocking circuit are enabled and a second state in which data strobe signal transfers through the blocking circuit are disabled.

21. The memory controller of claim 20, wherein the data strobe signal transfers enter a tristate phase after a postamble time.

22. A method of preventing corruption of data being transferred, in response to a data transfer request, through a data transfer gate of a processor-based system, including the steps of:
  commencing data transfer at a start time after issuance of the data transfer request;
  determining a predicted data transfer completion time;
  generating an end of data transfer signal before the predicted data transfer completion time; and
  in response to the end of data transfer signal, blocking further transfers of predetermined signals through the data transfer gate, wherein the predetermined signals include data strobe signals.

23. The method of claim 22, wherein:
  the predetermined signals have at least a first state corresponding to defined signal values and a second state independent of defined signal values, wherein the predetermined signals are in the first state during the data transfer and are in the second state after completion of the data transfer; and
  the end of data transfer signal for a given data transfer is generated before the predetermined signals enter the second state.

24. The method of claim 22, wherein the start time is determined based at least in part on a predetermined latency period.

* * * * *

UNITED STATES PATENT AND TRADEMARK OFFICE
CERTIFICATE OF CORRECTION

| | | |
|---|---|---|
| PATENT NO. | : 6,918,016 B1 | Page 1 of 1 |
| APPLICATION NO. | : 09/908146 | |
| DATED | : July 12, 2005 | |
| INVENTOR(S) | : James Magro | |

It is certified that error appears in the above-identified patent and that said Letters Patent is hereby corrected as shown below:

In the Claims:

Column 13, Claim 14, Line 10, please delete "coupled to an a" and substitute -- coupled to a --.

Column 14, Claim 20, Lines 15-16, please delete "a memory controller".

Signed and Sealed this
Twenty-first Day of July, 2015

Michelle K. Lee
*Director of the United States Patent and Trademark Office*